US008789059B2

(12) United States Patent
Foley et al.

(10) Patent No.: US 8,789,059 B2
(45) Date of Patent: Jul. 22, 2014

(54) DYNAMIC SCHEDULING FEASIBILITY ANALYSIS OF EVENT-DRIVEN APPLICATIONS BASED ON REDUCING TASKS OF OVERLAPPING EVENTS

(75) Inventors: Sean C. Foley, Ottawa (CA); Mike S. Fulton, Maple Ridge (CA)

(73) Assignee: International Business Machines Corporation, Armonk, NY (US)

( * ) Notice: Subject to any disclaimer, the term of this patent is extended or adjusted under 35 U.S.C. 154(b) by 2027 days.

(21) Appl. No.: 11/934,120

(22) Filed: Nov. 2, 2007

(65) Prior Publication Data

US 2009/0119668 A1 May 7, 2009

(51) Int. Cl.
*G06F 9/46* (2006.01)
(52) U.S. Cl.
USPC ............................ 718/102; 718/103; 718/100
(58) Field of Classification Search
None
See application file for complete search history.

(56) References Cited

U.S. PATENT DOCUMENTS

| 4,920,487 | A  | * | 4/1990  | Baffes ........................... | 718/105 |
| 6,345,287 | B1 | * | 2/2002  | Fong et al. ..................... | 718/102 |
| 6,901,592 | B2 | * | 5/2005  | Mar et al. ....................... | 718/102 |
| 7,266,571 | B2 | * | 9/2007  | Botzer et al. ................... | 719/318 |
| 8,185,903 | B2 | * | 5/2012  | Fulton et al. ................... | 718/103 |
| 2003/0071842 | A1 | * | 4/2003 | King et al. ..................... | 345/762 |
| 2005/0097556 | A1 | * | 5/2005 | Code et al. ..................... | 718/102 |
| 2005/0229177 | A1 | * | 10/2005 | Torii et al. ..................... | 718/100 |
| 2005/0283785 | A1 | * | 12/2005 | D'Souza ....................... | 718/100 |
| 2006/0253853 | A1 | * | 11/2006 | Jiang ............................. | 718/100 |
| 2007/0011683 | A1 | * | 1/2007 | Helander ....................... | 718/104 |
| 2008/0140488 | A1 | * | 6/2008 | Oral et al. ....................... | 705/8 |

OTHER PUBLICATIONS

Krithi Ramamritham, Allocation and Scheduling of Precedence-Related Periodic Tasks, IEEE Transactions on Parallel and Distributed Systems, vol. 6, No. 4, Apr. 1995.*
G. Manimaran et al., An Efficient Dynamic Scheduling Algorithm for Multiprocessor Real-Time Systems, IEEE Transactions on Parallel and Distributed Systems, vol. 9, No. 3, Mar. 1998.*
Bihari, Thomas, et al; Dynamic Adaption of Real-Time Software; ACM Transations on Computer Systems, vol. 9, No. 2, May 1991, pp. 143-174.
Valetto, Giuseppe, et al; A Mobile Agent Approach to Process-based Dynamic Adaption of Complex Software Systems; Columbia University, Department of Computer Science.
Vetter, Jeffrey, et al; Progress: a Toolkit for Interactive Program Steering; 24th Int'l Conference on Parallel Processing 1996 (ICPP 95).

* cited by examiner

*Primary Examiner* — Abdullah Al Kawsar
*Assistant Examiner* — Benjamin Wu
(74) *Attorney, Agent, or Firm* — Steven M. Greenberg, Esq.; CRGO Law

(57) ABSTRACT

Embodiments of the present invention provide a method, system and computer program product for dynamic feasibility analysis of event-driven program code. In an embodiment of the invention, a method for a dynamic feasibility analysis of event-driven program code can be provided. The method can include loading multiple different tasks associated with different registered events in event-driven program code of an event-driven application, reducing overlapping ones of the registered events for different ones of the tasks to a single task of the overlapping events to produce a reduced set of tasks and corresponding events, ordering the corresponding events of the reduced set of tasks and grouping the corresponding events by time slice for the event-driven application, and reporting whether or not adding a new event to a particular time slice for the event-driven application results in a depth of events in the particular time slice exceeding a capacity of the particular time slice rendering the event-driven application infeasible.

15 Claims, 2 Drawing Sheets

DYNAMIC SCHEDULING FEASIBILITY ANALYSIS OF EVENT-DRIVEN APPLICATIONS BASED ON REDUCING TASKS OF OVERLAPPING EVENTS

BACKGROUND OF THE INVENTION

1. Field of the Invention

The present invention relates to the field of event based or real-time programming and more particularly to feasibility analysis in schedulers for tasks in an event based program execution environment.

2. Description of the Related Art

Real-time computer programming refers to the study of computing systems subject to a real-time constraint—namely operational deadlines from event to system response. Similarly, event-driven programming refers to the study of computing systems in which the flow of operation of the computing system is determined by the occurrence of events within the computing system or the receipt of events by the computing system. In both real-time programming and event-driven programming (to the extent that one can be distinguished from another), the computing system must be able to handle a processing load in response to the occurrence of an event before an established deadline.

Scheduling is an important aspect of real-time and event-driven programming. Generally, a scheduler prioritizes tasks in a priority queue in response to the occurrence of events. In real-time environments, in particular, the scheduler also ensures that processes can meet deadlines. Meeting deadlines in a real-time or event-driven computing system, of course, is a crucial task in order to maintain the stability of the subject computing system.

Given the importance of assuring suitable processing resources to handle a series of anticipated events in a computing system, both real-time programmers and event-driven programmers statically analyze the ability of a subject computing system to handle expected event loads before fielding a real-time or event-driven system. Static analysis generally involves the analysis of a computer program without executing the computer program. By comparison, dynamic analysis refers to the analysis of the handling of event loads by a computer program during the execution of the computer program. In respect to the static analysis of a real-time or event-driven application, the cycle of development includes first a static analysis followed by modification and deployment of the application, followed by additional static analysis and so forth.

The foregoing tedious process can become particularly unworkable for large event-based applications. As such, a more dynamic and flexible way would be desirable in order to ensure that the application subject to analysis is both feasible and also will execute within defined constraints.

BRIEF SUMMARY OF THE INVENTION

Embodiments of the present invention address deficiencies of the art in respect to the analysis of an event-driven application and provide a novel and non-obvious method, system and computer program product for dynamic feasibility analysis of event-driven program code. In an embodiment of the invention, a method for a dynamic feasibility analysis of event-driven program code can be provided. The method can include loading multiple different tasks associated with different registered events in event-driven program code of an event-driven application, reducing overlapping ones of the registered events for different ones of the tasks to a single task of the overlapping events to produce a reduced set of tasks and corresponding events, ordering the corresponding events of the reduced set of tasks and grouping the corresponding events by time slice for the event-driven application, and reporting whether or not adding a new event to a particular time slice for the event-driven application results in a depth of events in the particular time slice exceeding a capacity of the particular time slice rendering the event-driven application infeasible.

In one aspect of the embodiment, reducing overlapping ones of the registered events for different ones of the tasks to a single task of the overlapping events can include computing a time frame from a start time to an end time for the different registered events, identifying different ones of the tasks sharing similar periods and approximately same start times within the computed time frame, determining events in the identified different ones of the tasks to be overlapping events, and reducing the identified different ones of the tasks to a single task with the overlapping events. Furthermore, computing a time frame from a start time to an end time for the different registered events can include computing a start time as a maximum start time for the different registered events, computing an end time as a least common multiple of all periods for the different registered events summed with the maximum start time, and defining the time frame as a period of time beginning with the start time and ending with the end time.

In a further aspect of the embodiment, grouping the corresponding events by time slice for the event-driven application can include associating lists of the corresponding events with respective time slices for the event-driven application. Alternatively, grouping the corresponding events by time slice for the event-driven application, can include, for each time slice of the event-driven application maintaining a counter for events associated of the time slice. Finally, in yet a further aspect of the embodiment, reporting whether or not adding a new event to a particular time slice for the event-driven application results in a depth of events in the particular time slice exceeding a capacity of the particular time slice rendering the event-driven application infeasible, can include reporting whether or not adding a new event to a particular time slice for the event-driven application results in a depth of events in the particular time slice exceeding a number of processors allocable to support the event-driven application thereby rendering the event-driven application infeasible.

In another embodiment of the invention, a software development data processing system can be configured for dynamic feasibility analysis of event-driven program code. The system can include a scheduler executing in a host computing platform, the schedule being configured to schedule events in an event-driven application. The system further can include dynamic feasibility logic coupled to the scheduler. The logic can include program code enabled to load multiple different tasks associated with different registered events in event-driven program code of the event-driven application, to reduce overlapping ones of the registered events for different ones of the tasks to a single task of the overlapping events to produce a reduced set of tasks and corresponding events, to order the corresponding events of the reduced set of tasks and to group the corresponding events by time slice for the event-driven application, and to report whether or not adding a new event to a particular time slice for the event-driven application results in a depth of events in the particular time slice exceeding a capacity of the particular time slice rendering the event-driven application infeasible.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic feasibility analysis of event-driven program code. In accordance with an embodiment of the present invention, each expected event in an event-driven program supported in a host computing platform can be identified and a time slice corresponding to each event can be determined. A list of events for each time slice can be maintained. Alternatively, a counter of events for each time slice can be maintained. Thereafter, new events can be added to the event-driven program so that a time slice can be determined for the new event. Finally, a number of events assigned to a particular time slice resulting from the newly added event can be compared to the actual capacity of the time slice in the host computing platform in order to determine the feasibility of adding the new event.

Figure 1:
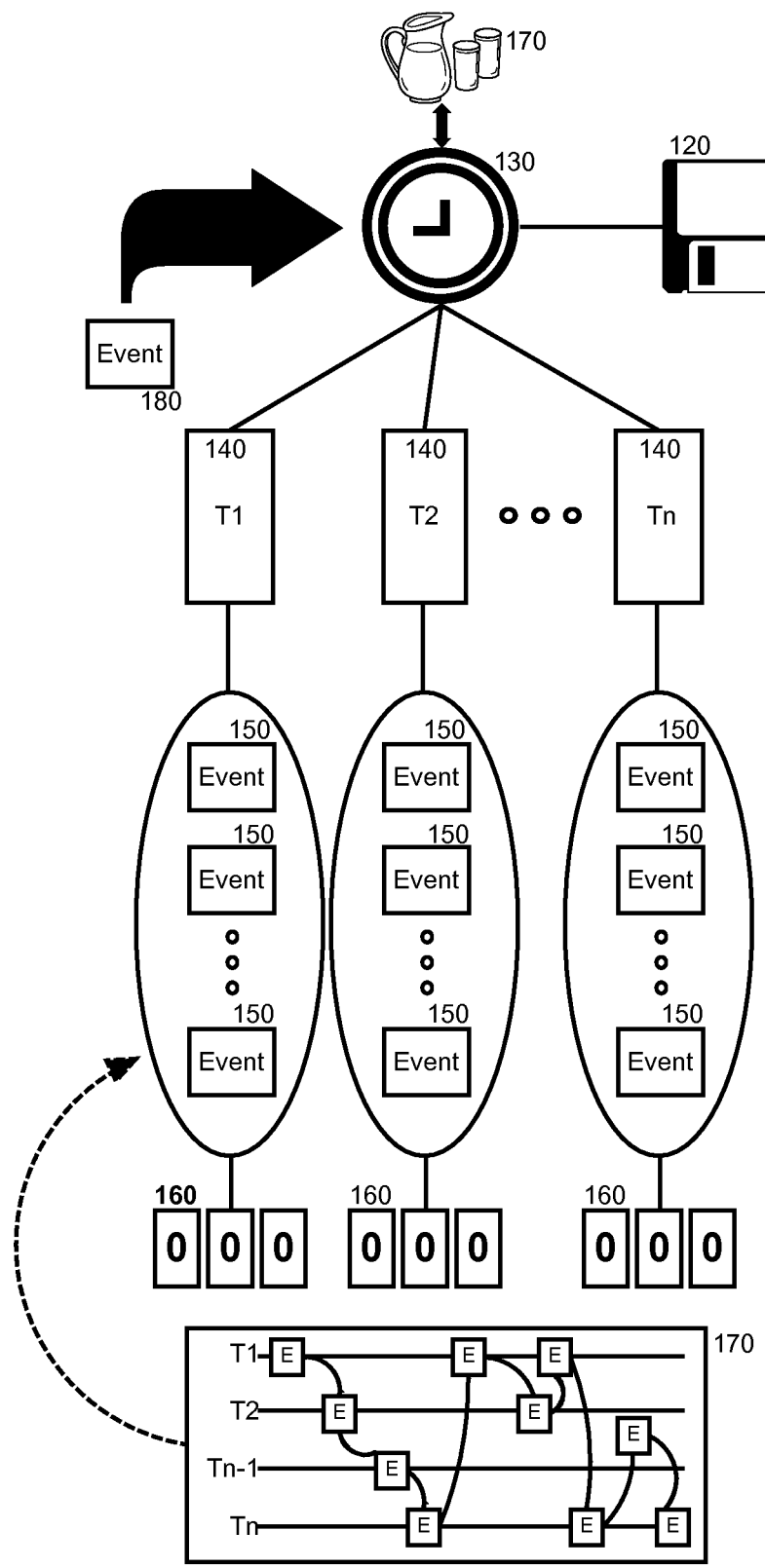
FIG. 1 is a pictorial illustration of a process for the dynamic feasibility analysis of event-driven program code.

In illustration, FIG. 1 is a pictorial illustration of a process for the dynamic feasibility analysis of event-driven program code. As shown in FIG. 1, the processing resources 130 consumed by the program code of an event-driven application 120 can be determined by way of partitioning the processing resources 130 into different time slices 140 and determining which events 150 for respective tasks in the event-driven application 120 occur during which time slices 140. In this regard, a number of tasks executing concurrently for the event-driven application 120 can be determined along with the periodicity of events 150 handled by the tasks and a duration of each of the tasks. Overlapping ones of the events 150 for different ones of the tasks can be determined so as to reduce the number of tasks under consideration in an optimized task grouping 170.

Thereafter, the events in the optimized task grouping 170 can be traversed in chronological order to generate a listing of events 150 for all time slices 140. Finally, the events falling within each time slice 140 can be associated with one another as a list of events 150 for each time slice 140. In the alternative, a counter 160 can be maintained for each time slice 140 in order to determine the depth of events 150 handled for each time slice 140. As each new event 180 is added to the event-driven application 120, the process can repeat inserting the new event 180 into a suitable time slice 140. The depth of events 150 in each time slice 140 can be compared to a known capacity 170 for each time slice 140. To the extent that the addition of the new event 180 causes the depth of a time slice 140 to exceed the known capacity 170, the event-driven application 120 can be determined to be infeasible.

Figure 2:
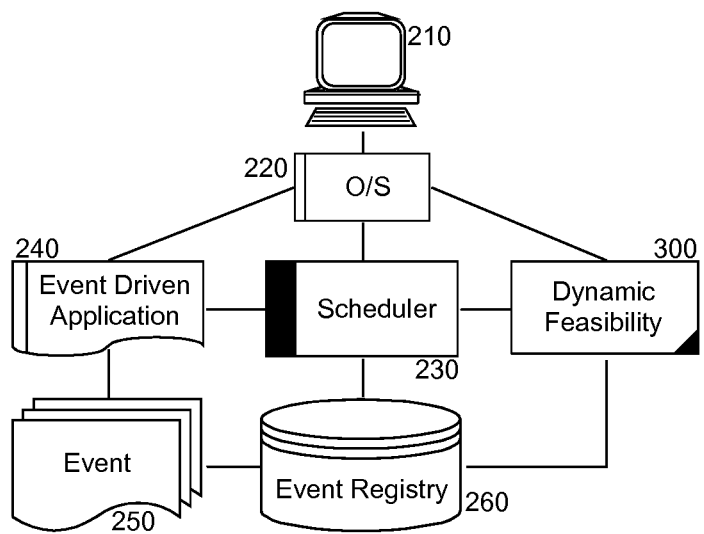
FIG. 2 is a schematic illustration of a software development data processing system configured for dynamic feasibility analysis of event-driven program code; and, FIG. 3 is a flow chart illustrating a process for the dynamic feasibility analysis of event-driven program code.

In further illustration, FIG. 2 is a schematic illustration of a software development data processing system configured for dynamic feasibility analysis of event-driven program code. The system can include a host computing platform 210 supporting the operation of an operating system 220. The operating system 220 can support the execution of an event driven application 240 configured to respond to multiple different events 250. A scheduler 230 can be coupled to the event-driven application 240 and can be configured to schedule event handling of the events 250 by tasks of the event driven application 240. Finally, an event registry 260 can be coupled to the scheduler 230 in order to store different events 250 registered for handling in the event driven application 240.

Notably, dynamic feasibility logic 300 can be coupled to the scheduler 230. The dynamic feasibility logic 300 can include program code enabled to identify overlapping ones of the events 250 for tasks in the event-driven application 240. In this regard, a start time and an end time can be computed for all of the events 250 for all of the tasks of the event-driven application 240. Whereas the start time can be the time in which a first one of the events is scheduled for handling, the end time can be computed as the least common multiple of all periods for all events 250 summed with the maximum start time for the events 250. Within the computed time frame, different ones of the events 250 for different tasks sharing similar periods and approximately the same start times can be viewed as overlapping and can be reduced to those of the events 250 for a single one of the different tasks.

The program code of the dynamic feasibility logic 300 can be enabled to process a reduced set of the events 250 for the different ordered tasks to create a new reduced set of events 250 chronologically. Yet further, the program code of the dynamic feasibility logic 300 can be enabled to group individual ones of the reduced set of events 250 according to similar time slice in which individual ones of the reduced set of events 250 are to be handled. Even yet further, the program code of the dynamic feasibility logic 300 can be enabled to compute a depth of the events 250 within each time slice and to compare the same to a capacity of the events 250 able to be handled within each time slice. Finally, the program code of the dynamic feasibility logic 300 can be enabled to insert a new one of the events 250 into a suitable time slice and to determine whether a depth for the suitable time slice exceeds an allowable capacity so as to render the event-driven application 240 infeasible. For example, the capacity can be limited to a number of processors in the host computing platform 210 allocatable to handle the events of the time slice.

Figure 3:
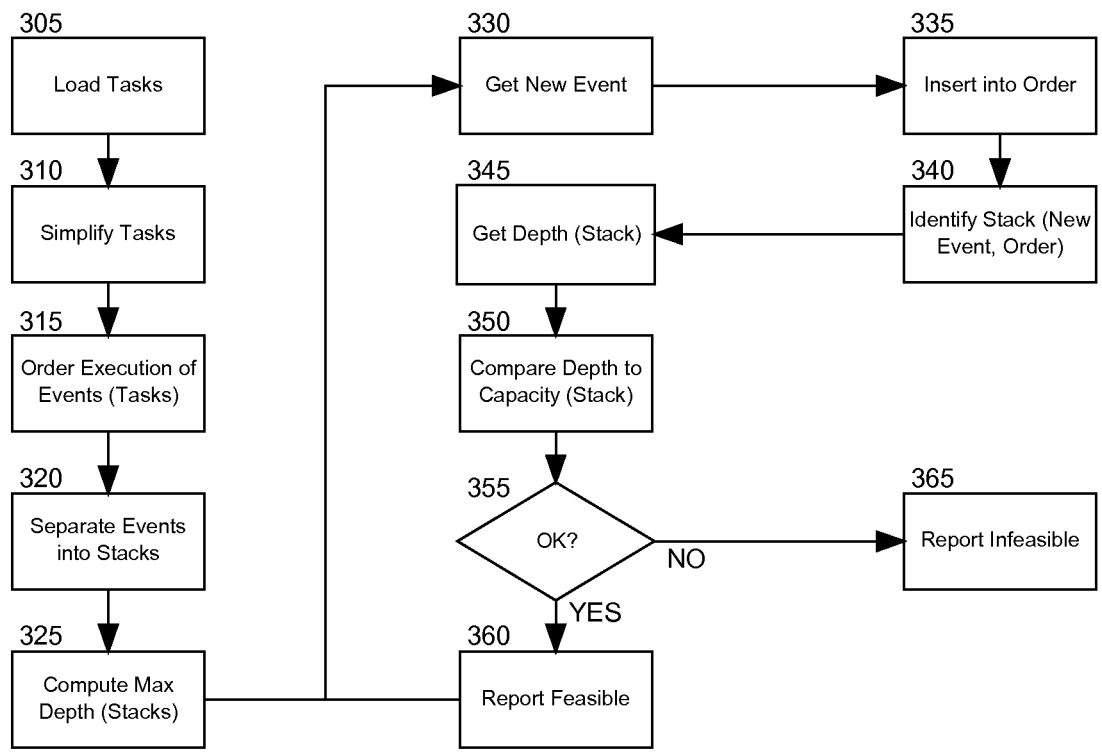

In yet further illustration of the operation of the dynamic feasibility logic 300, FIG. 3 is a flow chart illustrating a process for the dynamic feasibility analysis of event-driven program code. Beginning in block 305, the tasks for an event-driven application can be loaded and in block 310 the events for the loaded tasks can be simplified by treating the overlapping events of the different tasks as a single set of tasks for a single one of the different tasks. Thereafter, in block 315 an order of execution can be established for the remaining events in the simplified set of tasks and in block 320 the remaining events can be grouped according to time slice. Finally, in block 325, a maximum depth of events can be determined for each of the time slices.

In block 330, a new event can be proposed for handling in the event-driven application. In this regard, the new event can be proposed as part of an independent process apart from the execution of the event-driven application, or an integrated process during the execution of the event-driven application where the feasibility analysis itself is treated merely as another task to be scheduled. In either circumstance, in block 335 the newly proposed event can be inserted into the order of execution and a time slice into which the newly proposed event is to be grouped further can be identified in block 340. In block 345 a depth of the identified time slice further can be determined and compared to a capacity for the time slice in block 350.

In decision block 355, if the determined depth of the time slice resulting from the addition of the newly proposed event does not exceed the capacity of the time slice, then in block 360 the proposed addition of the event will be reported to be feasible and the process can return to block 330 with the addition of a next, newly proposed event. In contrast, in decision block 355 if the determined depth of the time slice resulting from the addition of the newly proposed event exceeds the capacity of the time slice, then in block 365 the proposed addition of the event will be reported to be infeasible. In response to a reported infeasible addition of a new event, the scheduler for the event-driven application can group threads differently to respond to unrelated events, to share resources, to pool threads, to segregate memory, or generally to take any action to render the proposed addition of the event feasible.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for a dynamic feasibility analysis of event-driven program code, the method comprising:
    loading multiple different tasks associated with different registered events in event-driven program code of an event-driven application;
    reducing overlapping ones of the registered events for a time frame for different ones of the tasks to a single task of the overlapping events to produce a reduced set of tasks and corresponding events;
    ordering the corresponding events of the reduced set of tasks and grouping the corresponding events by time slice for the event-driven application; and,
    reporting whether or not adding a new event to a particular time slice for the event-driven application results in a depth of events in the particular time slice exceeding a capacity of the particular time slice rendering the event-driven application infeasible.

2. The method of claim 1, wherein reducing overlapping ones of the registered events for different ones of the tasks to a single task of the overlapping events, comprises:
    computing the time frame from a start time to an end time for the different registered events;
    identifying different ones of the tasks sharing similar periods and start times within the computed time frame;
    determining events in the identified different ones of the tasks to be overlapping events; and,
    reducing the identified different ones of the tasks to a single task with the overlapping events.

3. The method of claim 2, wherein computing the time frame from a start time to an end time for the different registered events, comprises:
    computing the start time as a maximum start time for the different registered events;
    computing the end time as a least common multiple of all periods for the different registered events summed with the maximum start time; and,
    defining the time frame as a period of time beginning with the start time and ending with the end time.

4. The method of claim 1, wherein grouping the corresponding events by time slice for the event-driven application, comprises associating lists of the corresponding events with respective time slices for the event-driven application.

5. The method of claim 1, wherein grouping the corresponding events by time slice for the event-driven application, comprises for each time slice of the event-driven application maintaining a counter for events associated of the time slice.

6. The method of claim 1, wherein reporting whether or not adding a new event to a particular time slice for the event-driven application results in a depth of events in the particular time slice exceeding a capacity of the particular time slice rendering the event-driven application infeasible, comprises reporting whether or not adding a new event to a particular time slice for the event-driven application results in a depth of events in the particular time slice exceeding a number of processors allocable to support the event-driven application thereby rendering the event-driven application infeasible.

7. The method of claim 1, wherein reporting whether or not adding a new event to a particular time slice for the event-driven application results in a depth of events in the particular time slice exceeding a capacity of the particular time slice rendering the event-driven application infeasible, comprises:

proposing a new event for handling in the event-driven application;
inserting the newly proposed event into the order of execution;
identifying a time slice into which the newly proposed event is to be grouped;
determining a depth of the identified time slice and comparing the determined depth to a capacity for the time slice; and,
reporting the newly proposed event to be feasible if the determined depth of the time slice does not exceed the capacity of the time slice and otherwise reporting the newly proposed event to be infeasible.

8. A software development data processing system having a processor configured for dynamic feasibility analysis of event-driven program code, the system comprising:
   a scheduler executing on the processor, the schedule being configured to schedule events in an event-driven application; and,
   dynamic feasibility logic coupled to the scheduler comprising program code enabled to load multiple different tasks associated with different registered events in event-driven program code of the event-driven application, to reduce overlapping ones of the registered events for a time frame for different ones of the tasks to a single task of the overlapping events to produce a reduced set of tasks and corresponding events, to order the corresponding events of the reduced set of tasks and to group the corresponding events by time slice for the event-driven application, and to report whether or not adding a new event to a particular time slice for the event-driven application results in a depth of events in the particular time slice exceeding a capacity of the particular time slice rendering the event-driven application infeasible.

9. A computer program product comprising a computer memory storing computer usable program code for dynamic feasibility analysis of event-driven program code, the computer program product comprising:
   computer usable program code for loading multiple different tasks associated with different registered events in event-driven program code of an event-driven application;
   computer usable program code for reducing overlapping ones of the registered events for a time frame for different ones of the tasks to a single task of the overlapping events to produce a reduced set of tasks and corresponding events;
   computer usable program code for ordering the corresponding events of the reduced set of tasks and grouping the corresponding events by time slice for the event-driven application; and,
   computer usable program code for reporting whether or not adding a new event to a particular time slice for the event-driven application results in a depth of events in the particular time slice exceeding a capacity of the particular time slice rendering the event-driven application infeasible.

10. The computer program product of claim 9, wherein the computer usable program code for reducing overlapping ones of the registered events for different ones of the tasks to a single task of the overlapping events, comprises:
    computer usable program code for computing the time frame from a start time to an end time for the different registered events;
    computer usable program code for identifying different ones of the tasks sharing similar periods and start times within the computed time frame;
    computer usable program code for determining events in the identified different ones of the tasks to be overlapping events; and, computer usable program code for reducing the identified different ones of the tasks to a single task with the overlapping events.

11. The computer program product of claim 10, wherein the computer usable program code for computing the time frame from a start time to an end time for the different registered events, comprises:
    computer usable program code for computing the start time as a maximum start time for the different registered events;
    computer usable program code for computing the end time as a least common multiple of all periods for the different registered events summed with the maximum start time; and,
    computer usable program code for defining the time frame as a period of time beginning with the start time and ending with the end time.

12. The computer program product of claim 9, wherein the computer usable program code for grouping the corresponding events by time slice for the event-driven application, comprises computer usable program code for associating lists of the corresponding events with respective time slices for the event-driven application.

13. The computer program product of claim 9, wherein the computer usable program code for grouping the corresponding events by time slice for the event-driven application, comprises computer usable program code for maintaining a counter for events associated of the time slice for each time slice of the event-driven application.

14. The computer program product of claim 9, wherein the computer usable program code for reporting whether or not adding a new event to a particular time slice for the event-driven application results in a depth of events in the particular time slice exceeding a capacity of the particular time slice rendering the event-driven application infeasible, comprises computer usable program code for reporting whether or not adding a new event to a particular time slice for the event-driven application results in a depth of events in the particular time slice exceeding a number of processors allocable to support the event-driven application thereby rendering the event-driven application infeasible.

15. The computer program product of claim 9, wherein the computer usable program code for reporting whether or not adding a new event to a particular time slice for the event-driven application results in a depth of events in the particular time slice exceeding a capacity of the particular time slice rendering the event-driven application infeasible, comprises:
    computer usable program code for proposing a new event for handling in the event-driven application;
    computer usable program code for inserting the newly proposed event into the order of execution;
    computer usable program code for identifying a time slice into which the newly proposed event is to be grouped;
    computer usable program code for determining a depth of the identified time slice and comparing the determined depth to a capacity for the time slice; and,
    computer usable program code for reporting the newly proposed event to be feasible if the determined depth of the time slice does not exceed the capacity of the time slice and otherwise reporting the newly proposed event to be infeasible.

* * * * *